(12) United States Patent
Suzuki et al.

(10) Patent No.: US 9,810,521 B2
(45) Date of Patent: Nov. 7, 2017

(54) DISPLACEMENT DETECTION APPARATUS

(71) Applicant: DMG MORI SEIKI CO., LTD., Yamato-Koriyama, Nara (JP)

(72) Inventors: Akinori Suzuki, Isehara (JP); Masayuki Niiya, Isehara (JP); Kenji Matsushita, Isehara (JP); Terukazu Nishida, Isehara (JP); Hideaki Tamiya, Isehara (JP); Kayoko Taniguchi, Isehara (JP)

(73) Assignee: DMG MORI SEIKI CO., LTD., Yamato-Koriyama (JP)

( * ) Notice: Subject to any disclaimer, the term of this patent is extended or adjusted under 35 U.S.C. 154(b) by 0 days.

(21) Appl. No.: 15/008,086

(22) Filed: Jan. 27, 2016

(65) Prior Publication Data

US 2016/0223317 A1 Aug. 4, 2016

(30) Foreign Application Priority Data

Jan. 30, 2015 (JP) .................................. 2015-016553

(51) Int. Cl.
*G01B 11/00* (2006.01)
*G01B 9/02* (2006.01)
*G01D 5/38* (2006.01)

(52) U.S. Cl.
CPC .......... *G01B 11/002* (2013.01); *G01B 9/0209* (2013.01); *G01D 5/38* (2013.01)

(58) Field of Classification Search
CPC .................................................. G01B 11/002
See application file for complete search history.

(56) References Cited

U.S. PATENT DOCUMENTS

| 2007/0165220 | A1* | 7/2007 | Brady | ....................... | G01J 3/02 |
| | | | | | 356/310 |
| 2009/0257066 | A1* | 10/2009 | Tamiya | .................... | G01D 5/38 |
| | | | | | 356/482 |
| 2009/0268210 | A1* | 10/2009 | Prince | .................... | G01D 5/347 |
| | | | | | 356/494 |
| 2012/0287441 | A1* | 11/2012 | Kuroda | .................... | G01D 5/38 |
| | | | | | 356/499 |

FOREIGN PATENT DOCUMENTS

| JP | H07-332957 A | 12/1995 |
| JP | 2006-194855 A | 7/2006 |

* cited by examiner

*Primary Examiner* — Tarifur Chowdhury
*Assistant Examiner* — Omar Nixon
(74) *Attorney, Agent, or Firm* — Oliff PLC

(57) ABSTRACT

A displacement detection apparatus capable of stably and accurately detecting the amount of displacement. The length of a polarization maintaining fiber for transmitting the light from a light source to a displacement detector is set not to be equal to a length obtained by dividing, by the wavelength of the light source, a product of an even integral multiple of a length, which is obtained by multiplying twice the length of a resonator by the refractive index of the resonator, and a beat length obtained by a difference between the propagation constants of two polarization modes. Alternatively, the length of the polarization maintaining fiber is set to be larger than a length, which is obtained by dividing, by the wavelength of the light source, a product of a coherence length and a beat length obtained from a difference between the propagation constants of two polarization modes.

5 Claims, 6 Drawing Sheets

DISPLACEMENT DETECTION APPARATUS

BACKGROUND OF THE INVENTION

Field of the Invention

The present invention relates to a displacement detection apparatus that detects a displacement of a surface to be measured, using the light emitted from a light source.

Description of the Related Art

Conventionally, as the apparatus that contactlessly measures a displacement of a surface to be measured, a displacement detection apparatus using light has been widely used. Various types of schemes are available for the displacement detection apparatus. A specific configuration of the displacement detection apparatus will be described later in the embodiments. In any of the schemes, the displacement detection apparatus is configured to guide the light from a light source to a displacement detector through an optical fiber. Then, the displacement detection apparatus varies the phase of the light from the light source based on a displacement of the surface to be measured and detects a change state of the phase of the light, thereby detecting the amount of displacement of the surface to be measured.

RELATED ART DOCUMENT

Patent Document

Patent Literature 1: Japanese Patent Laid-Open Publication No. 07-332957
Patent Literature 2: Japanese Patent Laid-Open Publication No. 2006-194855

SUMMARY OF THE INVENTION

Problems to be Solved by the Invention

When a displacement detection apparatus detects a displacement of a surface to be measured, it is important that the phase of the light reaching a displacement detector from a light source is stable. That is, the application of a stress causing a change in the bending state of an optical fiber that guides the light from a light source, the fitting state of optical fiber connectors, and/or the bonding state between an optical fiber and a ferrule for connecting the optical fibers might cause an unwanted fluctuation of the phase of light. Once an unwanted fluctuation of the phase of light occurs, the stability in detecting the displacement of a surface to be measured by a displacement detector will degrade, resulting in a decrease in the detection accuracy of displacement.

The examples of a method, in which an unwanted phase fluctuation of light in an optical fiber does not affect the displacement detection accuracy in a displacement detector, include a method, for example, including the steps of: eliminating the polarization of the light output from an optical fiber; polarizing the resulting light with a polarizer; taking out any polarized light; and causing the polarized light to enter a displacement detector (see Patent Literature 1).

Moreover, in another method, a polarization maintaining fiber is used as the optical fiber, and the extinction ratio of the light incident on the polarization maintaining fiber is increased to reduce the light of an unwanted polarization component (see Patent Literature 2).

The method for eliminating the polarization of the light output from an optical fiber and then polarizing the resulting light with a polarizer has a problem that the amount of light caused to enter a displacement detector will decrease because any polarized light is taken out and caused to enter a displacement detector after eliminating the polarized light once.

Moreover, with the method for increasing the extinction ratio of the light incident on a polarization maintaining fiber, the amount of light does not decrease, but the method has a problem that in adding an optical connecter and the like, the alignment of an optical axis at each fitting portion needs to be precisely performed and thus the manufacturing cost will increase.

Moreover, in recent years, as the resolution of an A/D converter in a displacement detection apparatus increases, the leakage of a polarized beam having a component perpendicular to the optical axis of a polarization maintaining fiber becomes a problem, and thus the amplitude of the interference caused by the unwanted light needs to be set within the quantization error of an A/D converter.

An object of the present invention is to provide a displacement detection apparatus capable of stably and accurately detecting the amount of displacement by eliminating the conventional measure for supplying a beam having a high extinction ratio to a displacement detector and also by attenuating the interference with an unwanted beam without loss of the amount of light.

Means to Solve the Problem

A displacement detection apparatus according to a first aspect of the present invention includes: a low-coherence laser light source that emits light and has a plurality of oscillation spectra associated with a length of a resonator; a lens for condensing the light from the laser light source; a polarization maintaining fiber for transmitting the light condensed by the lens, a length of the polarization maintaining fiber being selected so as not to be equal to a length obtained by dividing, by a wavelength of the light source, a product of an integral multiple of a length, which is obtained by multiplying twice the length of the resonator by a refractive index of the resonator, and a beat length obtained from a difference between propagation constants of two polarization modes; and a displacement detector that divides a beam transmitted by the polarization maintaining fiber into two beams and converts the respective beams to an interference signal by causing the respective beams to interfere with each other, in order to set a variation of a phase applied to each of the divided beams to an amount of displacement.

A displacement detection apparatus according to a second aspect of the present invention includes: a low-coherence light source that emits light and has a coherence length; a lens for condensing the light from the light source; a polarization maintaining fiber for transmitting the light condensed by the lens, the polarization maintaining fiber being manufactured with a length longer than a length, which is obtained by dividing, by a wavelength of the light source, a product of the coherence length and a beat length obtained from a difference between propagation constants of two polarization modes; and a displacement detector that divides a beam transmitted by the polarization maintaining fiber into two beams and converts the respective beams to an interference signal by causing the respective beams to interfere with each other, in order to set a variation of a phase applied to each of the divided beams to an amount of displacement.

Effects of the Invention

According to the present invention, by configuring a polarization maintaining fiber to have any length in accordance with the oscillation characteristics of a light source, it is possible to attenuate the interference with an unwanted beam. Thus, a component that causes a phase fluctuation in a displacement detection signal of the displacement detection apparatus is minimized and only a fluctuation in amplitude of an interference signal is allowed, thereby allowing for the displacement detection less susceptible to a stress from the outside of the polarization maintaining fiber. According to the present invention, the amount of light is not lost, and therefore the use efficiency of the light from a light source is excellent and furthermore the measure for supplying a beam having a high extinction ratio to a displacement detector is eliminated.

DESCRIPTION OF THE PREFERRED EMBODIMENTS

Hereinafter, a displacement detection apparatus of one exemplary embodiment of the present invention (hereinafter, referred to as "the present example") is described with reference to the accompanying drawings. First, three examples of the whole configuration of a displacement detection apparatus to which the present invention is applied are described in FIG. 1 to FIG. 3.

[1. Example of Whole Configuration of Displacement Detection Apparatus (Example of Displacing Diffraction Grating)]

Figure 1:
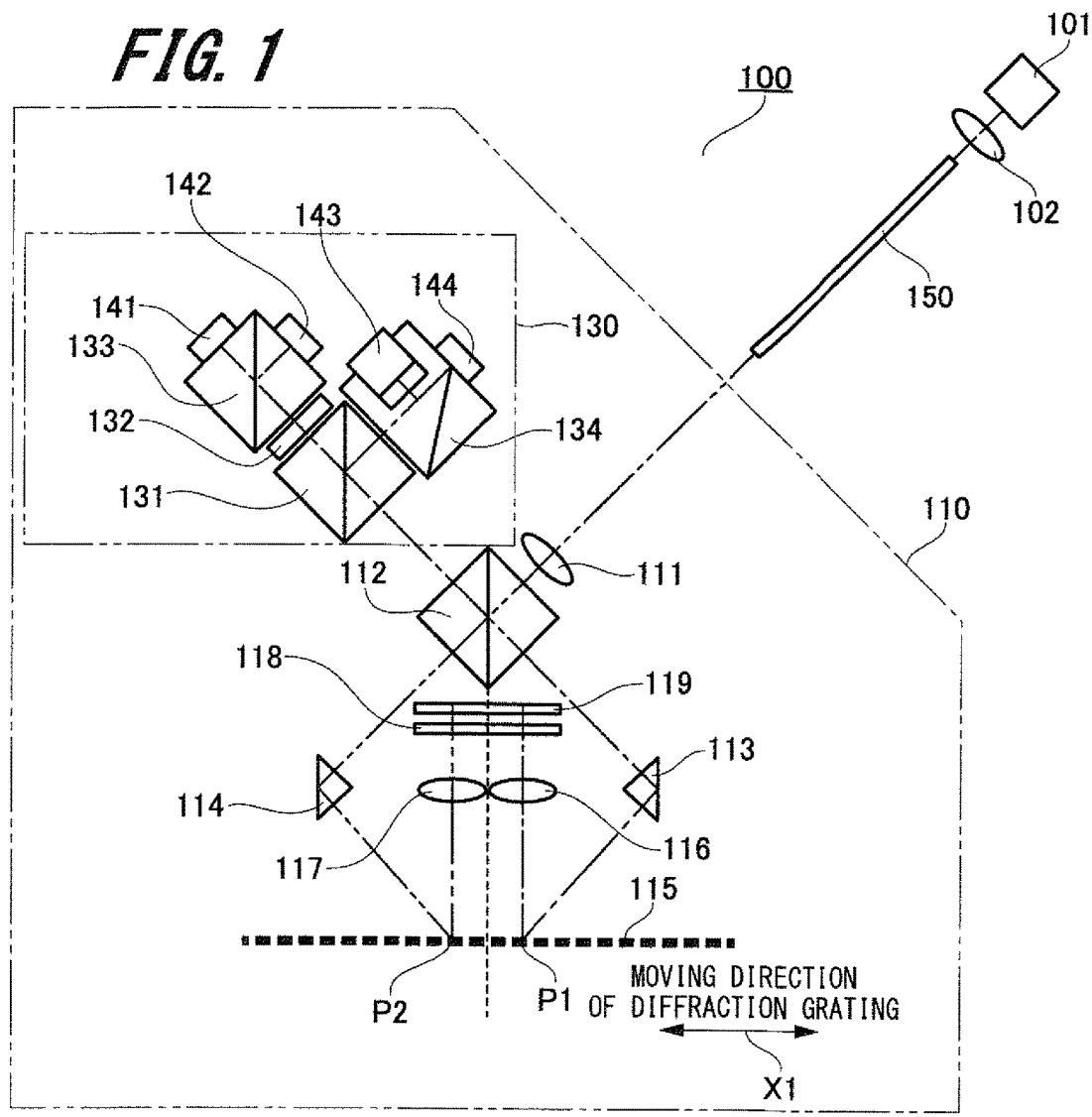
FIG. 1 is a configuration diagram showing an example of a displacement detection apparatus, to which the present invention is applied, (an example of displacing a diffraction grating).

FIG. 1 shows a configuration example of a displacement detection apparatus 100 that displaces a diffraction grating in conjunction with the displacement of a surface to be measured.

The displacement detection apparatus 100 includes a light source 101. A laser, an LED, or the like can be used as the light source 101. When a laser is used for the light source 101, a low-coherence multimode semiconductor laser diode may be used. The examples of the semiconductor laser include a self-pulsation laser diode and a super luminescence diode.

Moreover, the examples of the solid state laser used as the light source 101 include a YAG laser, an Nd laser, a titan-sapphire laser, a fiber laser, and the like. Furthermore, the examples of the laser used as the light source 101 include a helium-cadmium laser (metal laser) and a dye laser (liquid laser). Note that, preferably the light source 101 continuously oscillates, has a wide oscillation wavelength in a longitudinal mode, and has a low coherence.

Alternatively, as the light source 101, a single-mode semiconductor laser whose coherence is reduced by high-frequency superimposition may be used.

The beam emitted from the light source 101 is condensed by a first lens 102 and caused to enter a polarization maintaining fiber 150. The polarization maintaining fiber 150 is an optical fiber having a different refractive index distribution between the vertical direction and horizontal direction of the cross section of the core, and will be detailed later. Note that, the polarized light of the light source 101 is preferably incident, with the optical axis thereof aligned with an optical axis along which the polarization in the core cross section of the polarization maintaining fiber 150 is maintained, but the both optical axes may not be precisely aligned. The length of the polarization maintaining fiber 150 is determined by the conditions described later.

The beam transmitted by the polarization maintaining fiber 150 is caused to enter a displacement detector 110. The beam incident on the displacement detector 110 is caused to enter a first polarizing beam splitter (PBS) 112 via a second lens 111. The first polarizing beam splitter 112 divides the beam into an S-polarized beam and a P-polarized beam. For example, the S-polarized beam is reflected by the first polarizing beam splitter 112, while the P-polarized beam transmits through the first polarizing beam splitter 112.

The S-polarized beam reflected by the first polarizing beam splitter 112 is caused to enter a diffraction grating 115 via a first mirror 113. Moreover, the P-polarized beam transmitting through the first polarizing beam splitter 112 is caused to enter the diffraction grating 115 via a second mirror 114.

The diffraction grating 115 functions as a scale for detecting the amount of displacement of a surface to be measured, and moves in conjunction with the displacement of the surface to be measured, as indicated by an arrow X1.

The diffraction light of each beam incident on the diffraction grating 115 is caused to enter a third mirror 119 via a third lens 116 or fourth lens 117 and a first phase plate 118, and each beam reflected by the third mirror 119 is returned to the diffraction grating 115. The first phase plate 118 includes a ¼ wavelength plate, for example.

The diffraction light of the beam returned to the diffraction grating 115 is returned to the first polarizing beam splitter 112 via the first mirror 113 or second mirror 114. Here, because each beam passes through the first phase plate 118 twice, the S-polarized light returns as the P-polarized light and the P-polarized light returns as the S-polarized light.

Accordingly, two beams returned from the diffraction grating 115 are emitted in a superimposed state from a surface different from the incident surface of the first polarizing beam splitter 112 of the beam from the light source 101, and the superimposed beam is caused to enter a light receiving portion 130.

The beam incident on the light receiving portion 130 is caused to enter a beam splitter 131, and is divided into two beams. One of the beams divided into two is caused to enter a second polarizing beam splitter 133 via a second phase plate 132. The beam incident on the second polarizing beam splitter 133 is caused to enter a first light receiving element 141 and second light receiving element 142 after being divided for each polarization component. Moreover, the other one of the beams divided into two is caused to enter a third polarizing beam splitter 134 and is divided for each polarization component, and then the divided beams are caused to enter a third light receiving element 143 and fourth light receiving element 144, respectively.

Next, how the displacement detection apparatus 100 detects the displacement of the diffraction grating 115 is described. The beam emitted from the light source 101 is condensed and caused to enter an end face of the polarization maintaining fiber 150 by the first lens 102. The beam output from the polarization maintaining fiber 150 is collimated by the second lens 111. The collimated beam is caused to enter the first polarizing beam splitter 112 in a polarization state where it is divided into 1:1 by the first polarizing beam splitter 112. One of the beams divided by the first polarizing beam splitter 112, the beam having an S polarization component, passes through the first mirror 113 and is caused to enter a position P1 of the diffraction grating 115. The beam vertically diffracted by the diffraction grating 115 results in circularly-polarized light by the first phase plate 118, and is then reflected by the third mirror 119 and folded back to the diffraction grating 115 side. Here, the beam results in a beam having a P polarization component by transmitting through the first phase plate 118 again, i.e., results in the light that is diffracted twice by the diffraction grating 115, and travels toward the first polarizing beam splitter 112.

The beam having the P polarization component divided by the first polarizing beam splitter 112 passes through the second mirror 114, and is caused to enter a position P2 of the diffraction grating 115. The beam vertically diffracted by the diffraction grating 115 results in circularly-polarized light by the first phase plate 118, and is then reflected by the third mirror 119 and folded back. Here, the beam results in a beam having the S polarization component by transmitting through the first phase plate 118 again, i.e., results in the light that is diffracted twice by the diffraction grating 115, and travels toward the first polarizing beam splitter 112.

The two beams whose polarization components are interchanged with each other are superimposed by the first polarizing beam splitter 112 and the superimposed beam travels toward the light receiving portion 130. The superimposed beam includes the S polarization component and P polarization component of linearly-polarized light. The beam is divided into two beams by the beam splitter 131, and one of the divided beams is caused to enter the second polarizing beam splitter 133 through the second phase plate 132.

In passing through the second phase plate 132, the linearly-polarized lights orthogonal to each other result in the superimposition of circularly-polarized lights rotating in the directions opposite to each other. Then, the polarization direction of the linearly-polarized light incident on the second polarizing beam splitter 133 rotates twice when the diffraction grating 115 moves by one wavelength in the moving direction. Accordingly, the first light receiving element 141 and the second light receiving element 142 obtain an interference signal $A\cos(4Kx+\delta')$. Here, A represents the amplitude of the interference signal, K is a wave number represented by $2\pi/\Lambda$, x represents an amount of movement of the diffraction grating, $\delta'$ represents an initial phase, and $\Lambda$ is the grating pitch of the diffraction grating.

Moreover, the other one of the beams divided into two by the beam splitter 131 is caused to enter the third polarizing beam splitter 134. In this case, because the third polarizing beam splitter 134 is rotated by 45° with respect to the optical axis of the second polarizing beam splitter 133, the phase of a signal to be photoelectrically converted in the third light receiving element 143 and fourth light receiving element 144 differs by 90° from that in the first light receiving element 141 and second light receiving element 142. Thus, the moving direction of the diffraction grating can be recognized.

As described above, the displacement detection apparatus 100 can detect, from the light receiving states in the first to fourth light receiving elements 141 to 144, an interference signal as the amount of displacement in an X1 direction of the diffraction grating 115.

Note that the interference signal obtained by the four light receiving elements 141 to 144 does not contain a component related to the wavelength of the light source 101. Accordingly, even if a fluctuation in the wavelength of the light source due to a change in atmospheric pressure, humidity, and/or temperature occurs, the interference intensity will not be affected.

[2. Example of Whole Configuration of Displacement Detection Apparatus (Example of Michelson's Interferometer Type)]

Figure 2:
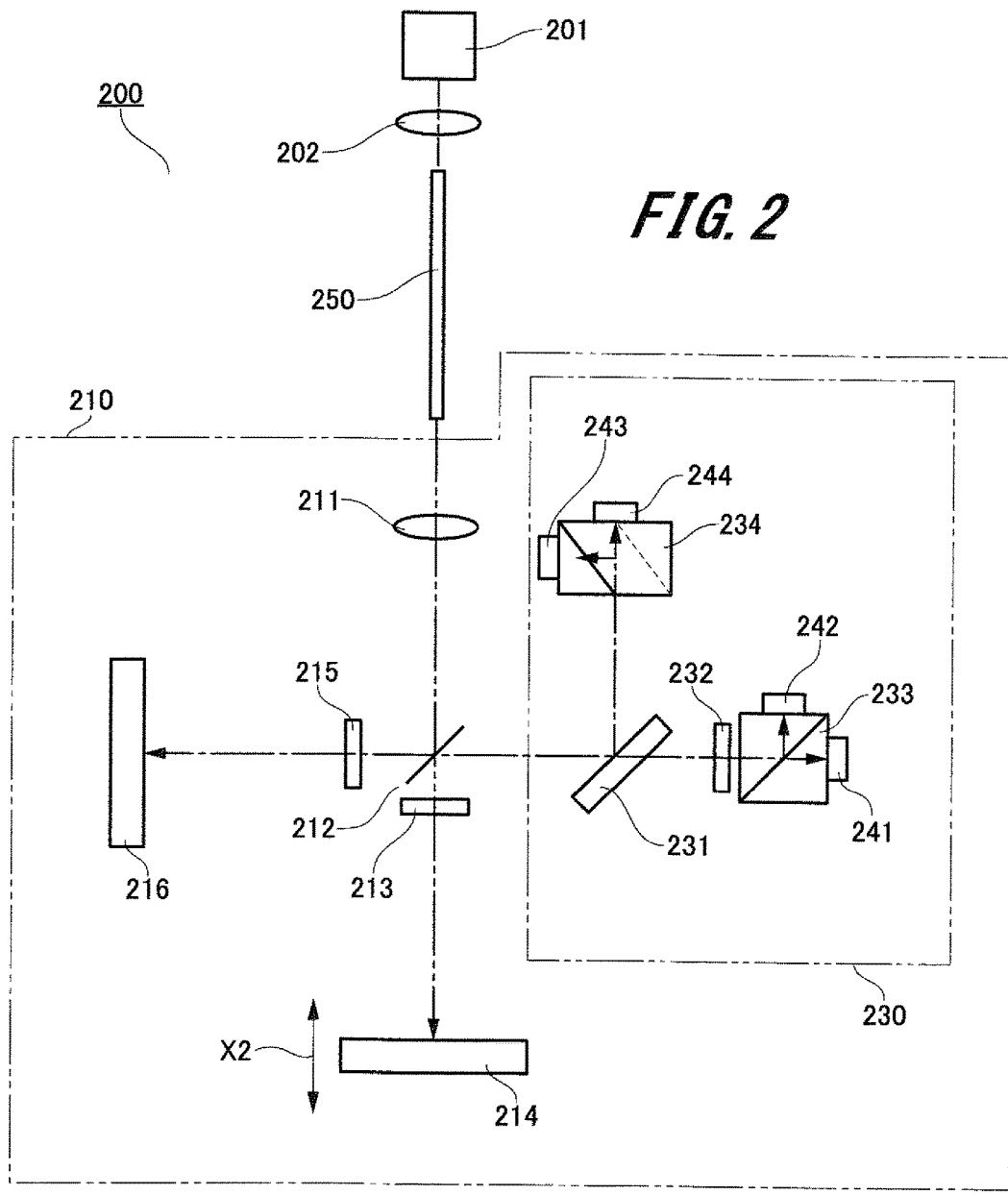
FIG. 2 is a configuration diagram showing an example of a displacement detection apparatus, to which the present invention is applied, (an example of a Michelson's interferometer type).

FIG. 2 shows a configuration example of a Michelson's interferometer type displacement detection apparatus 200 that moves a target mirror 214 in conjunction with the displacement of a surface to be measured.

The displacement detection apparatus 200 includes a light source 201. The conditions applicable as the light source 201 are the same as those of the light source 101 described in the displacement detection apparatus 100 shown in FIG. 1. For example, a light source having a lower coherence, a multimode semiconductor laser, or the like is used as the light source.

The beam emitted from the light source 201 is condensed by a first lens 202, and is caused to enter a polarization maintaining fiber 250. The polarization maintaining fiber 250 is an optical fiber having a different refractive index distribution between the vertical direction and horizontal direction of the cross section of the core, and the length of the polarization maintaining fiber 250 is determined by the conditions described later.

The beam transmitted by the polarization maintaining fiber 250 is caused to enter a displacement detector 210. The beam incident on the displacement detector 210 is caused to enter a first polarizing beam splitter 212 via a second lens 211. The P-polarized beam transmitting through the first polarizing beam splitter 212 is caused to enter the target mirror 214 via a first phase plate 213. The target mirror 214 moves in an X2 direction in conjunction with the displacement of the surface to be measured. Moreover, the S-polarized beam reflected by the first polarizing beam splitter 212 is caused to enter a reference mirror 216 via a second phase plate 215. The first phase plate 213 and second phase plate 215 include a ¼ wavelength plate, for example.

Note that, when the target mirror 214 is located at a reference position, the optical path length from the first polarizing beam splitter 212 to the target mirror 214 and the optical path length from the first polarizing beam splitter 212 to the reference mirror 216 are set to be equal.

Then, the beams returned to the first polarizing beam splitter 212 from the target mirror 214 and reference mirror 216 result in a superimposed interference signal, which is then caused to enter a light receiving portion 230.

The beam incident on the light receiving portion 230 is caused to enter a beam splitter 231, and is divided into two beams. One of the beams divided into two is caused to enter a second polarizing beam splitter 233 via a third phase plate 232. The beam incident on the second polarizing beam splitter 233 is caused to enter a first light receiving element 241 and second light receiving element 242 after being divided for each polarization component. Moreover, the other one of the beams divided into two is caused to enter a third polarizing beam splitter 234 and is divided for each polarization component, and then the divided beams are caused to enter a third light receiving element 243 and fourth light receiving element 244, respectively.

With the above configuration, the optical path of the component of a beam reflected by the reference mirror 216 among the beams supplied to the light receiving portion 230 from the first polarizing beam splitter 212 is fixed. On the other hand, the optical path of the component of a beam reflected by the target mirror 214 varies in conjunction with the displacement of the surface to be measured.

Accordingly, the displacement detection apparatus 200 can detect, from the light receiving states in the first to fourth light receiving elements 241 to 244, an interference signal as the amount of displacement in the X2 direction of the target mirror 214.

[3. Example of Whole Configuration of Displacement Detection Apparatus (Example in which Target Mirror And Reference Mirror Are Arranged In Parallel)]

Figure 3:
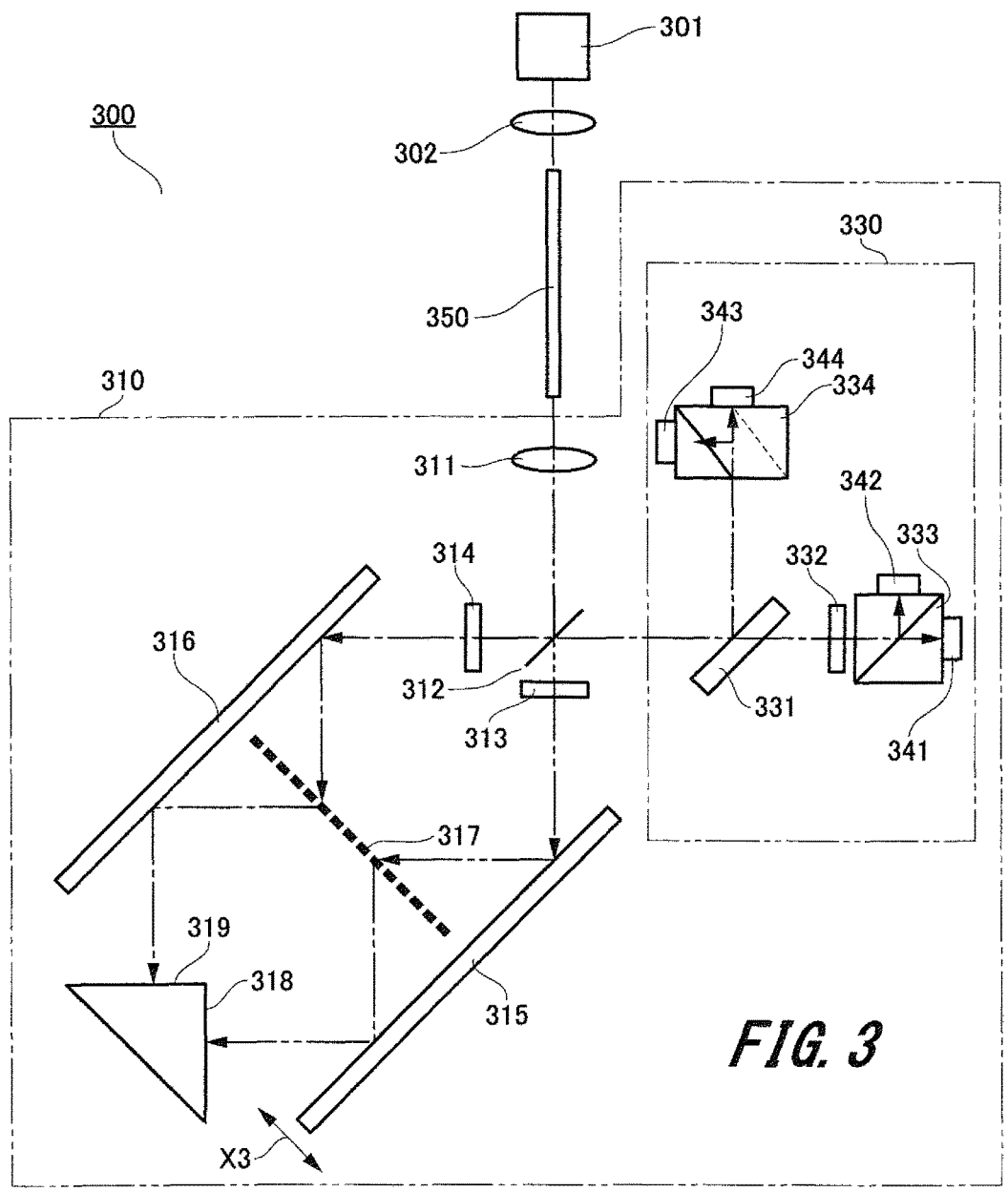
FIG. 3 is a configuration diagram showing an example of a displacement detection apparatus, to which the present invention is applied, (an example in which a target mirror and a reference mirror are arranged in parallel).

FIG. 3 shows a configuration example of a displacement detection apparatus 300 in which a target mirror 315 and reference mirror 316 are arranged in parallel.

The displacement detection apparatus 300 includes a light source 301. The conditions applicable as the light source 301 are the same as those of the light source 101 described in the displacement detection apparatus 100 shown in FIG. 1. For example, a light source having a lower coherence, a multi-mode semiconductor laser, or the like is used as the light source.

The beam emitted from the light source 301 is condensed by a first lens 302, and is caused to enter a polarization maintaining fiber 350. The polarization maintaining fiber 350 is an optical fiber having a different refractive index distribution between the vertical direction and horizontal direction of the cross section of the core, and the length of the polarization maintaining fiber 350 is determined by the conditions described later.

The beam transmitted by the polarization maintaining fiber 350 is caused to enter a displacement detector 310. The beam incident on the displacement detector 310 is caused to enter a first polarizing beam splitter 312 via a second lens 311. The P-polarized beam transmitting through the first polarizing beam splitter 312 is caused to enter the target mirror 315 via a first phase plate 313. The first phase plate 313 includes a ¼ wavelength plate, for example. Here, the beam incident on the target mirror 315 is caused to enter at the angle of 45° with respect to the target mirror 315. The target mirror 315 moves in an X3 direction in conjunction with the displacement of the surface to be measured.

The beam reflected by the target mirror 315 is caused to enter a transmission type diffraction grating 317, and the diffraction light transmitting through the transmission type diffraction grating 317 is caused to enter the target mirror 315. Then, the diffraction light reflected by the target mirror 315 is caused to enter a mirror 318. The incident angle of the diffraction light with respect to the mirror 318 is set to 90°, and the mirror 318 reflects the incident diffraction light to the incidence direction.

The S-polarized beam reflected by the first polarizing beam splitter 312 is caused to enter the reference mirror 316 via the second phase plate 314. The second phase plate 314 includes a ¼ wavelength plate, for example. Here, the beam incident on the reference mirror 316 is caused to enter at the angle of 45° with respect to the reference mirror 316.

The beam reflected by the reference mirror 316 is caused to enter the transmission type diffraction grating 317, and the diffraction light transmitting through the transmission type diffraction grating 317 is caused to enter the reference mirror 316. Then, the diffraction light reflected by the reference mirror 316 is caused to enter a mirror 319. The incident angle of the diffraction light with respect to the mirror 319 is set to 90°, and the mirror 319 reflects the incident diffraction light to the incidence direction. The first phase plate 313 and second phase plate 314 include a ¼ wavelength plate, for example.

The beam reflected by the mirrors 318 and 319 follows a path opposite to the path at the time of incidence, and is caused to enter the first polarizing beam splitter 312. Then, the two beams returned to the first polarizing beam splitter 312 result in a superimposed interference signal, which is then caused to enter the light receiving portion 330.

The beam incident on the light receiving portion 330 is caused to enter a beam splitter 331, and is divided into two beams. One of the beams divided into two is caused to enter a second polarizing beam splitter 333 via a third phase plate 332. The beam incident on the second polarizing beam splitter 333 is caused to enter a first light receiving element 341 and second light receiving element 342 after being divided for each polarization component. Moreover, the other one of the beams divided into two is caused to enter a third polarizing beam splitter 334 and is divided for each polarization component, and then the divided beams are caused to enter a third light receiving element 343 and fourth light receiving element 344, respectively.

With the above configuration, the component of a beam reflected by the reference mirror 316 among the beams supplied to the light receiving portion 330 from the first polarizing beam splitter 312 results in a beam passing through the same place of the transmission type diffraction grating 317. On the other hand, the component of a beam reflected by the target mirror 315 results in a beam passing through a different place of the transmission type diffraction grating 317, due to a movement in the X3 direction of the target mirror 315. Accordingly, the interfering state of an interference signal superimposed by the first polarizing beam splitter 312 varies depending on the position of the target mirror 315, so that the displacement detection apparatus 300 can detect, from the light receiving states in the first to fourth light receiving elements 341 to 344, the phase component of the beam passing through the diffraction grating as the amount of displacement in the X3 direction of the target mirror 314. Note that, in the configuration shown in FIG. 3, the optical path length will not vary even if the position of the target mirror 315 changes.

[4. Description of Polarization Maintaining Fiber]

The displacement detection apparatuses 100, 200, and 300 use the polarization maintaining fibers 150, 250, and 350 for beam transmission between the light sources 101, 201, and 301 and the displacement detectors 110, 210, and 310, respectively.

Figure 4:
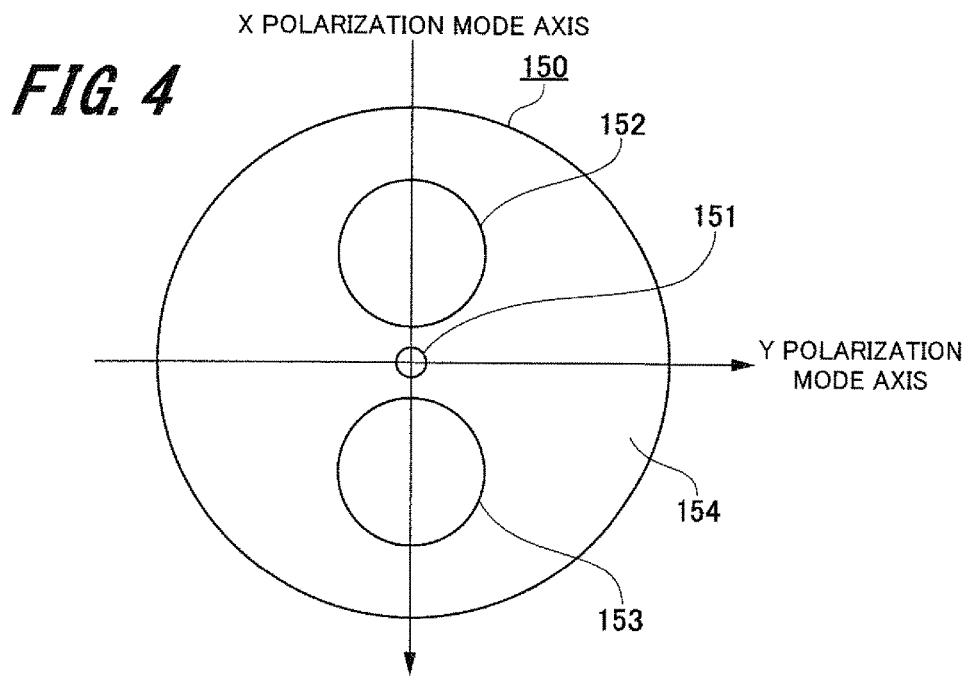
FIG. 4 is a cross sectional view showing an example of a polarization maintaining fiber according to one exemplary embodiment of the present invention.

FIG. 4 shows the cross section of a configuration example of the polarization maintaining fiber 150. The other polarization maintaining fibers 250 and 350 have the same configuration as the polarization maintaining fiber 150.

The polarization maintaining fiber 150 includes stress applying members 152 and 153 above and below a core 151 for transmitting a beam. Then, with the stress applying members 152 and 153 applying a stress to the core 151 from the above and below, the whole polarization maintaining fiber 150 is covered with a clad 154.

In the example, the vertical direction along which a stress is applied to the core 151 is defined as an X polarization mode axis, while a direction perpendicular to the X polarization mode axis is defined as a Y polarization mode axis. Here, the X polarization mode axis serves as an optical axis along which polarization is maintained.

Incidentally, the beam passing through the polarization maintaining fiber 150 might contain the component (X-polarized mode) of the optical axis, along which the polarization of the polarization maintaining fiber 150 is maintained, and the component (Y-polarized mode) perpendicular thereto. Generally, the extinction ratio of a semiconductor laser is said to be approximately 20 dB, so the semiconductor laser does not emit perfect linearly-polarized light. Moreover, there is a variation in the angle adjustment of an optical axis in entering the polarization maintaining fiber 150.

Using the polarization maintaining fiber 150 allows the polarization to be maintained for the component of the X polarization mode axis and component of the Y polarization mode axis. However, the refractive indexes of the polarization component of the X polarization mode axis and polarization component of the Y polarization mode axis in the core 151 are different from each other, and therefore when a stress is applied to the polarization maintaining fiber 150, a phase difference is caused between a beam via the X polarization mode axis and a beam via the Y polarization mode axis.

Here, unless the light quantity of a beam via the Y polarization mode axis is small enough as compared with the light quantity of a beam via the X polarization mode axis, the beam via the X polarization mode axis and the beam via the Y polarization mode axis will interfere with each other. Thus, if there is a stress applied to the polarization maintaining fiber 150, a slight phase change will be detected and the detection accuracy of displacement will degrade.

Then, in the present example, the coherence of the light source and the length of the polarization maintaining fiber 150 are specified so as to minimize the influences thereof.

[5. Example of Using Multimode Laser as Light Source]

Next, the conditions for determining the length of the polarization maintaining fibers 150, 250, and 350 are described. As the conditions for determining the length of the polarization maintaining fibers 150, 250, and 350, there are two conditions as follows: a condition when a multimode laser is used as the light sources 101, 201, and 301; and a condition when a light source having a wide band with a poor coherence is used as the light sources 101, 201, and 301.

First, the condition when a multimode laser is used is described.

The examples of a typical low-coherence laser light source having a plurality of oscillation spectra associated with the length of a resonator include a multimode semiconductor laser and a high-frequency superimposed single-mode semiconductor laser. The length of a resonator herein is, for example in the case of a semiconductor laser, the distance between one end face (mirror surface) and the other end face, and the wavelength A of the laser beam is determined by the length of a resonator.

If a period from an interfering state where the optical path length difference is zero until when the interference intensity rises again and reaches a peak is defined as one cycle, then a distance $L_{period}$ causing interference is given by Formula 1 below.

$$L_{period} = 2 \times n_{eff} \times L_{cav} \quad \text{(Formula 1)}$$

Here, $n_{eff}$ is the refractive index of a resonator and $L_{cav}$ is the length of the resonator.

That is, Formula 1 means that the peak of interference intensity appears, in the beam, at an integral (m) multiple of a length, which is obtained by multiplying twice the length of a resonator by the refractive index of the resonator.

Next, an optical delay distance D at the output end of a fiber between the component of the X polarization mode axis and the component of the Y polarization mode axis, the components propagating through the polarization maintaining fiber 150, is given by Formula 2 below.

$$D = \lambda \times L_{fiber} / L_{beat} \quad \text{(Formula 2)}$$

Here, $\lambda$ represents the wavelength of a light source, $L_{fiber}$ represents the optical fiber length (length of a polarization maintaining fiber), and $L_{beat}$ represents a beat length.

Here, if the difference between the propagation constants ($\beta x$, $\beta y$) indicative of the speed of light in the X polarization mode axis and in the Y polarization mode axis, respectively, the light propagating through a polarization maintaining fiber, is expressed by the Formula $\Delta \beta = \beta x - \beta y$, the beat length can be expressed by Formula 3 below.

$$L_{beat} = 2\pi / \Delta\beta \quad \text{(Formula 3)}$$

That is, when the optical delay distance D generated from a difference between the propagation constants matches the distance causing an interference, a beam via the X polarization mode axis and a beam via the Y polarization mode axis will interfere with each other.

Accordingly, the length of the polarization maintaining fiber 150 is set not to be equal to a length obtained by dividing, by the wavelength of a light source, a product of an integral multiple of a length, which is obtained by multiplying twice a length of the resonator of a light source by the refractive index of the resonator, and a beat length obtained from a difference between the propagation constants of the X and Y polarization modes of a polarization maintaining fiber. Thus, the interference between a beam via the X polarization mode axis and a beam via the Y polarization mode axis can be avoided, so that stable displacement detection against a stress on the polarization maintaining fiber 150 can be performed.

Formula 4 below is for calculating the optical fiber length $L_{fiber}$.

$$m \times L_{period} = \lambda \times L_{fiber} / L_{beat}$$

$$m \times 2 \times n_{eff} \times L_{cav} = \lambda \times L_{fiber} / L_{beat}$$

$$L_{fiber} = 2m \times n_{eff} \times L_{cav} \times L_{beat} / \lambda \quad \text{(Formula 4)}$$

Figure 5:
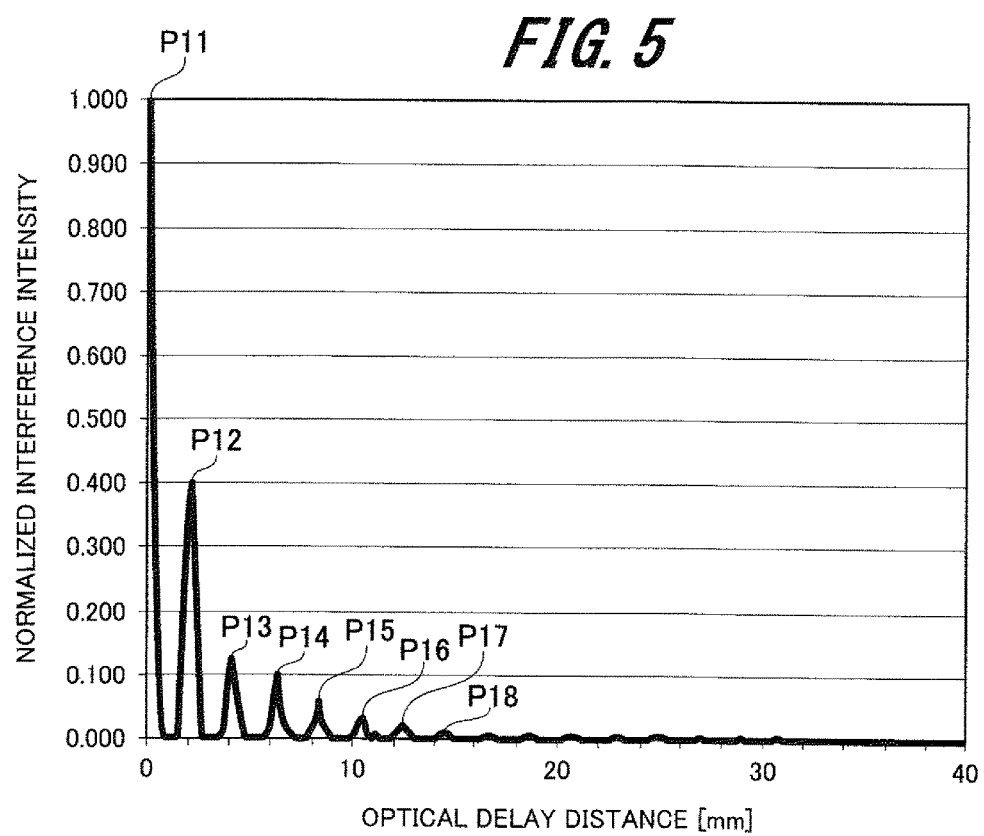
FIG. 5 is a characteristic chart showing an example of a multimode laser according to one exemplary embodiment of the present invention.

In the case of a multimode semiconductor laser, the intensity of interference between a beam via the X polarization mode axis and a beam via the Y polarization mode axis is as shown in FIG. 5, for example, where the beams hardly interfere with each other, as the optical delay distance increases. That is, when the interference intensity when the optical delay distance is zero (at a position of peak P11) is defined as one, there are peaks P12, P13, P14, and so on, where the interference intensity becomes gradually weaker every time the optical delay distance departs by a fixed distance from zero, and the interference intensity becomes approximately zero at a certain optical delay distance and thereafter.

Here, setting the length of the polarization maintaining fiber 150 so as to avoid the interference between a beam via the X polarization mode axis and a beam via the Y polarization mode axis means setting the length to have an optical delay distance at which the interference intensity, for example, between peak P11 and peak P12 becomes approximately zero. The length may be set to a length having an optical delay distance at which the interference intensity between peaks other than between peak P11 and peak P12 becomes approximately zero.

[6. Example of Using Light Source having Wide Band with Poor Coherence]

The examples of a low-coherence light source having a coherence length include a light source that does not have a plurality of oscillation spectra associated with the length of a resonator described above but has a specific wavelength interval and whose intensity broadly varies with wavelength. The examples of such a light source include a super luminescence diode, an LED (light emitting diode), and a titan-sapphire laser as the solid state laser.

When the light sources of such schemes are used as the light sources 101, 201 and 301, a coherence length $L_{low}$, of the light source is measured in advance.

Figure 6:
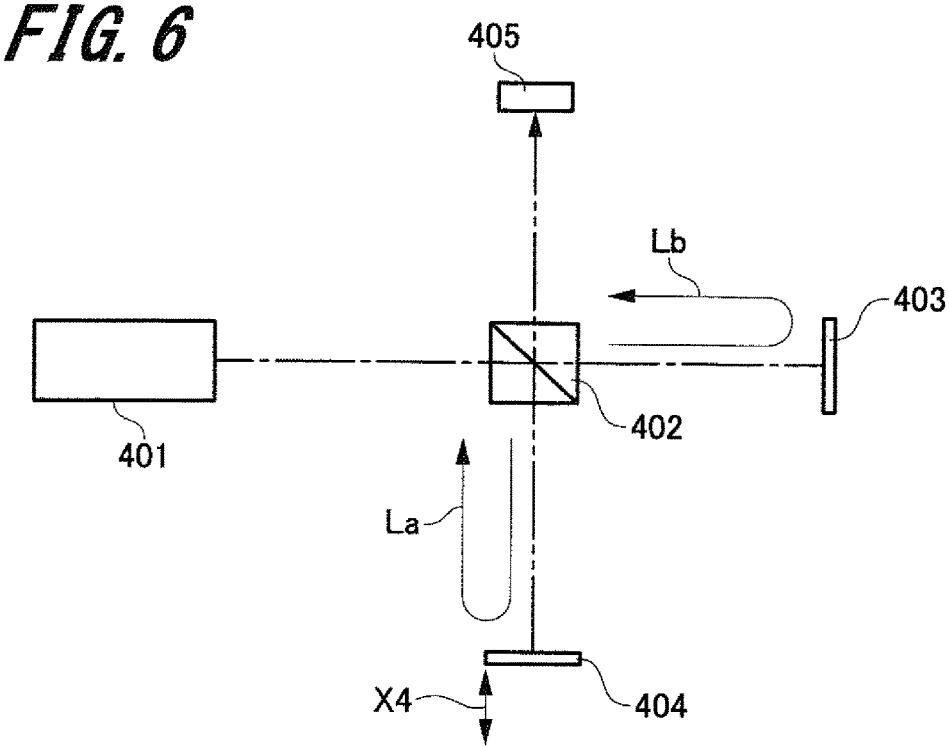
FIG. 6 is a configuration diagram showing a configuration example for measuring the coherence length of a light source having a wide band of a poor coherence, according to one exemplary embodiment of the present invention.

FIG. 6 shows a configuration example for measuring the coherence length $L_{low}$ of a light source. Note that FIG. 6 shows the principle of measuring the coherence length $L_{low}$, where the configuration unnecessary in describing the fundamental principle of measurement is omitted.

Here, a light source 401 is the light source to be measured. The beam output by the light source 401 is caused to enter a polarizing beam splitter 402, and is divided into one polarization component and the other polarization component. The one polarization component is reflected by a fixed mirror 403 and returns to the polarizing beam splitter 402, while the other polarization component is reflected by a movable mirror 404 and returns to the polarizing beam splitter 402. The position of the movable mirror 404 moves in an X4 direction.

Then, the two beams returned to the polarizing beam splitter 402 are superimposed and caused to enter a light receiving element 405 in the superimposed state.

Figure 7:
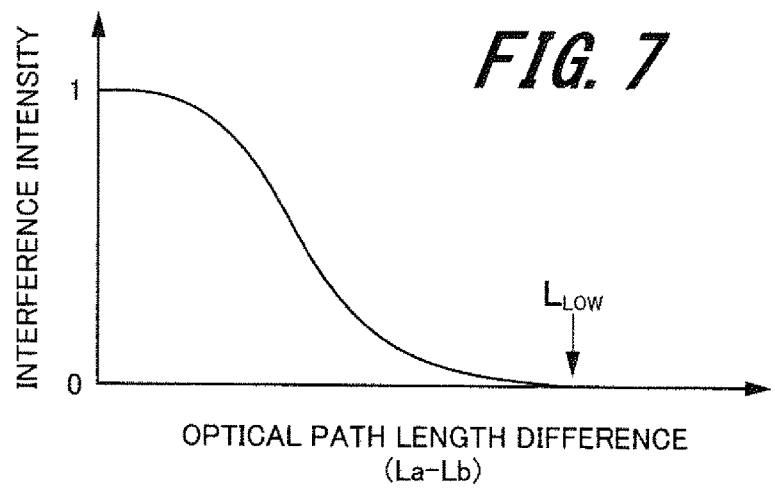
FIG. 7 is a characteristic chart showing an example of the coherence length according to one exemplary embodiment of the present invention.

FIG. 7 shows the interference intensity detected by the light receiving element 405.

Here, an optical path length (round trip distance) between the polarizing beam splitter 402 and the movable mirror 404 is designated by La, while an optical path length (round trip distance) between the polarizing beam splitter 402 and the fixed mirror 403 is designated by Lb. Then, the horizontal axis of FIG. 7 represents an optical path length difference (La-Lb).

As seen from FIG. 7, when the optical path length difference (La-Lb) is zero, the interference intensity becomes the maximum value 1, and hereinafter as the optical path length difference increases, the interference intensity becomes approximately zero. For example, the optical path length difference at which the interference intensity becomes 1/1000 of the maximum value 1 is designated by the coherence length $L_{low}$, of a light source.

Then, a product of the coherence length $L_{low}$ of a light source calculated in this manner, and a beat length obtained from a difference between the propagation constants of the X and Y polarization modes of the polarization maintaining fiber 150 is calculated, and the length of the polarization maintaining fiber 150 is set to be significantly longer than the length obtained by dividing the product of the beat length by the wavelength of the light source 101. The displacement detection apparatus 100 using the polarization maintaining fiber 150 of such a length is capable of avoiding the interference between a beam via the X polarization mode axis and a beam via the Y polarization mode axis, so that stable displacement detection against a stress on the polarization maintaining fiber 150 can be performed.

Generally, the above-described low-coherence light source has a wider wavelength interval than a multimode semiconductor laser and has the very short coherence length $L_{low}$, and therefore the optical fiber length $L_{fiber}$ rarely becomes very long.

Formula 5 below expresses the conditions for determining the above-described length $L_{fiber}$ of the polarization maintaining fiber 150.

$$L_{low} \leq L_{fiber}/L_{beat} \times \lambda$$

$$L_{fiber} \geq L_{low} \times L_{beat}/\lambda \quad \text{(Formula 5)}$$

As described above, even when whichever light source is used, the length of a polarization maintaining fiber is determined under the above-described conditions, so that the interference between a beam via the X polarization mode axis and a beam via the Y polarization mode axis can be avoided. Accordingly, with the displacement detection apparatus of the present example, stable displacement detection against a stress, such as bend, applied to an optical fiber can be performed and the detection accuracy of displacement will improve. Moreover, the polarized beam emitted from a light source is preferably incident, with the optical axis thereof aligned with an optical axis along which the polarization in the core cross section of the polarization maintaining fiber is maintained. However, in the present example, the accuracy can be maintained even if the optical axis of the end face of the polarization maintaining fiber is not strictly aligned.

Note that, in the description so far, the conditions of the length of the polarization maintaining fiber 150 in the displacement detection apparatus 100 shown in FIG. 1 have been shown, but the conditions of the length of the polarization maintaining fibers 250 and 350 in the displacement detection apparatuses 200 and 300 shown in FIG. 2 and FIG. 3 can be determined in a similar manner.

[7. Example of Combining Plurality of Fibers]

Each of the polarization maintaining fibers 150, 250, and 350 in the displacement detection apparatuses 100, 200, and 300 may use a plurality of polarization maintaining fibers connected with each other.

Figure 8:
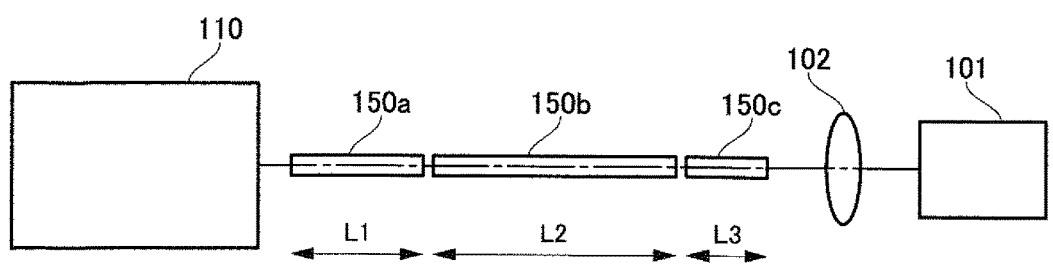
FIG. 8 is a configuration diagram showing an example of connecting a plurality of polarization maintaining fibers according to one exemplary embodiment of the present invention.

For example, as shown in FIG. 8, a beam from the light source 101 may be caused to enter a fiber, which is formed by fitting and connecting three polarization maintaining fibers 150*a*, 150*b*, and 150*c* to each other, via the first lens 102. A beam propagating through the three polarization maintaining fibers 150*a*, 150*b*, and 150*c* is caused to enter the displacement detector 110.

The fitting of the polarization maintaining fibers 150*a*, 150*b*, and 150*c* indicates a state where the end faces of the polarization maintaining fibers 150*a*, 150*b*, and 150*c* are connected to each other without a gap. Such a fitting state can be realized using connectors (not shown) attached to a polarization maintaining fiber, for example.

The length of each of the polarization maintaining fibers 150*a*, 150*b*, and 150*c* needs to be set to a length in consideration of the coherence of a light source depending on the type of a light source as previously described, but the following conditions are further added. That is, the countermeasure needs to be taken against an interference between a beam via the X polarization mode axis and a beam via the Y polarization mode axis, the interference being generated from leakage of the beams of the X polarization mode axis and Y polarization mode axis, the leakage being generated from the fitting portion between the respective polarization maintaining fibers 150a, 150b, and 150c.

For example, if polarization maintaining fibers having the same length are fitted, then due to the leakage at the fitting portion, a beam via an X+Y polarization mode axis and a beam via a Y+X polarization mode axis may interfere with each other.

When there is a plurality of fitting portions, as the connection order of a plurality of polarization maintaining fibers, it is necessary to avoid a situation where a total length of the polarization maintaining fibers including a last polarization maintaining fiber (e.g., the polarization maintaining fiber 150a in FIG. 8) and all the combinations of the other polarization maintaining fibers (e.g., the polarization maintaining fibers 150b and 150c in FIG. 8) excluding the last polarization maintaining fiber becomes equal to a length obtained by dividing, by the wavelength of a light source, a product of an even integral multiple of a length, which is obtained by multiplying the length of a resonator by the refractive index of the resonator, and a beat length obtained by a difference between the propagation constants of the X and Y polarization modes of the polarization maintaining fiber. By such conditions, in an interference between the lights emitted from the last polarization maintaining fiber, the lights each having a different propagation phase difference caused by a fitting portion, the number of combinations of interferences having a large influence on an interference between the principal components can be reduced. Moreover, each interference in the component of an interference other than the combinations of interferences having a large influence on the principal interference can be neglected because it is originally small enough.

For example, in the case of a polarization maintaining fiber through which light having the X polarization mode as the principal component is caused to propagate, when the principal component is caused to interfere with the X polarization mode of the polarization maintaining fiber at the next stage, there is a component leaking into the Y polarization mode. Here, various leakage components are generated by a plurality of fitting portions, but the interference between the Y polarization modes can be neglected because it is sufficiently small.

Moreover, when a light source having a wide band with a poor coherence is used, the length of each of the polarization maintaining fibers 150a, 150b, and 150c needs to be set to $2^m \times L$ (m is an integer of 0 or more, L is the length of the shortest polarization maintaining fiber), and the length of the respective polarization maintaining fibers should not have the same combination of m and L.

For example, the lengths of the respective polarization maintaining fibers need to satisfy $L1 \neq L2 \neq L3$, such as $L1=2 \times L3$ and $L2=4 \times L3$.

[8. Variation]

Note that, the displacement detection apparatus, to which the present invention is applied, may detect a displacement using a configuration and principle different from those of the three displacement detection apparatuses 100, 200, and 300 shown in FIG. 1, FIG. 2, and FIG. 3. That is, the present invention may be applicable to any displacement detection apparatus having other configuration as long as it is configured to guide the light from a light source to a displacement detector via a polarization maintaining fiber.

Moreover, although the example of FIG. 8 using a plurality of polarization maintaining fibers shows an example suitable for the displacement detection apparatus 100 of the example of FIG. 1, the conditions of the length of each of the polarization maintaining fibers are applicable when a plurality of polarization maintaining fibers is used in the displacement detection apparatuses 200 and 300 shown in FIG. 2 and FIG. 3. Furthermore, although FIG. 8 shows an example of fitting three polarization maintaining fibers 150a, 150b, and 150c, the same conditions as the example described in FIG. 8 are applicable when two or more, or four or more polarization maintaining fibers are fitted.

REFERENCE SIGNS LIST 100 displacement detection apparatus
101 light source
102 first lens
110 displacement detector
111 second lens
112 first polarizing beam splitter
113 first mirror
114 second mirror
115 diffraction grating
116 third lens
117 fourth lens
118 first phase plate
119 third mirror
130 light receiving portion
131 beam splitter
132 second phase plate
133 second polarizing beam splitter
134 third polarizing beam splitter
141 first light receiving element
142 second light receiving element
143 third light receiving element
144 fourth light receiving element
150, 150a, 150b, 150c polarization maintaining fiber
151 core
152, 153 stress applying member
154 clad
200 displacement detection apparatus
201 light source
202 first lens
210 displacement detector
211 second lens
212 first polarizing beam splitter
213 first phase plate
214 target mirror
215 second phase plate
216 reference mirror
230 light receiving portion
231 beam splitter
232 third phase plate
233 second polarizing beam splitter
234 third polarizing beam splitter
241 first light receiving element
242 second light receiving element
243 third light receiving element
244 fourth light receiving element
250 polarization maintaining fiber
300 displacement detection apparatus
301 light source
302 first lens
310 displacement detector
311 second lens
312 first polarizing beam splitter 313 first phase plate
314 second phase plate
315 target mirror
316 reference mirror
317 transmission type diffraction grating
318, 319 mirror
330 light receiving portion
331 beam splitter
332 third phase plate
333 second polarizing beam splitter
334 third polarizing beam splitter
341 first light receiving element
342 second light receiving element
343 third light receiving element
344 fourth light receiving element
350 polarization maintaining fiber
401 light source
402 polarizing beam splitter
403 fixed mirror
404 movable mirror
405 light receiving element

What is claimed is:

1. A displacement detection apparatus, comprising:
a low-coherence laser light source that has a resonator, emits light and has a plurality of oscillation spectra associated with a resonator length $L_{cav}$ of the resonator;
a lens that condenses the light from the laser light source;
a polarization maintaining fiber that transmits the light condensed by the lens, the polarization maintaining fiber having a length selected so as to avoid interference between a beam via an X polarization mode axis and a beam via a Y polarization mode axis, by being not equal to $2m \times n_{eff} \times L_{cav} \times L_{beat}/\lambda$, where:
m is a positive integer,
$n_{eff}$ is a refractive index of the resonator,
$L_{cav}$ is the resonator length,
$L_{beat}$ is a beat length obtained from a difference between propagation constants of two polarization modes, and
$\lambda$ is a wavelength of the light source; and
a displacement detector that divides a beam transmitted by the polarization maintaining fiber into two beams and converts the respective beams to an interference signal by causing the respective beams to interfere with each other, in order to set a variation of a phase applied to each of the divided beams to an amount of displacement.

2. The displacement detection apparatus according to claim 1,
wherein the polarization maintaining fiber is formed of a plurality of polarization maintaining fibers fitted to each other with detachable connectors, and
wherein a situation is avoided where when there is a plurality of fitting portions, as a connection order of the polarization maintaining fibers, a total length of the polarization maintaining fibers including a last polarization maintaining fiber and all combinations of the other polarization maintaining fibers excluding the last one becomes equal to a length obtained by dividing, by the wavelength of the light source, a product of an integral multiple of a length, which is obtained by multiplying twice the length of the resonator by the refractive index of the resonator, and a beat length obtained from a difference between propagation constants of X and Y polarization modes of the polarization maintaining fiber.

3. A displacement detection apparatus comprising:
a low-coherence light source that emits light and has a coherence length;
a lens that condenses the light from the light source;
a polarization maintaining fiber that transmits the light condensed by the lens, the polarization maintaining fiber having a length longer than a length obtained by dividing, by a wavelength of the light source, a product of the coherence length of the light source and a beat length obtained from a difference between propagation constants of two polarization modes; and
a displacement detector that divides a beam transmitted by the polarization maintaining fiber into two beams and converts the respective beams to an interference signal by causing the respective beams to interfere with each other, in order to set a variation of a phase applied to each of the divided beams to an amount of displacement.

4. The displacement detection apparatus according to claim 3, wherein
wherein the polarization maintaining fiber is formed of a plurality of polarization maintaining fibers fitted to each other with detachable connectors, and
wherein each of the polarization maintaining fibers fitted to each other has a length of $2^m \times L$ (m is an integer of 0 or more, L is a length of the shortest polarization maintaining fiber) and the length of each of the polarization maintaining fibers fitted to each other is different from one another.

5. A displacement detection apparatus, comprising:
a low-coherence laser light source that emits light;
a lens that condenses the light from the laser light source;
a polarization maintaining fiber that transmits the light condensed by the lens, the polarization maintaining fiber having a length avoiding an interference between a beam via an X polarization mode axis and a beam via a Y polarization mode axis; and
a displacement detector that divides a beam transmitted by the polarization maintaining fiber into two beams and converts the respective beams to an interference signal by causing the respective beams to interfere with each other, in order to set a variation of a phase applied to each of the divided beams to an amount of displacement.

* * * * *